United States Patent [19]
Costello et al.

[11] Patent Number: 5,755,199
[45] Date of Patent: May 26, 1998

[54] DISCHARGE IGNITION APPARATUS FOR INTERNAL COMBUSTION ENGINE HAVING BUILT-IN OVERSPEED DISABLE CAPABILITY

[75] Inventors: John J. Costello, Lexington; George T. Hummert; Edward D. Moran, both of Aiken, all of S.C.

[73] Assignee: R. E. Phelon Co., Inc., Aiken, S.C.

[21] Appl. No.: 728,822

[22] Filed: Oct. 10, 1996

[51] Int. Cl.$^6$ ............................................. F02P 9/00
[52] U.S. Cl. ............................................. 123/335
[58] Field of Search ............................. 123/335, 334

[56] References Cited

U.S. PATENT DOCUMENTS

| | | | |
|---|---|---|---|
| 3,993,031 | 11/1976 | Schmaldienst et al. | 123/335 |
| 4,038,951 | 8/1977 | Schweikart | 123/335 |
| 4,344,395 | 8/1982 | Kondo et al. | 123/335 |
| 4,404,940 | 9/1983 | Sieja | 123/335 |

*Primary Examiner*—Andrew M. Dolinar
*Attorney, Agent, or Firm*—Dority & Manning

[57] ABSTRACT

A discharge ignition apparatus for use with a small internal combustion engine has built-in overspeed disable capability. At operating speeds below an overspeed threshold, revolution of a magnet assembly past a stator unit having a magnetically permeable core causes accumulation of charge across a storage capacitor. When the capacitor has reached a fully charged state, a triggering signal is applied to the gate of a SCR device to cause rapid discharge through the primary coil of a step-up transformer. The higher voltage produced at the secondary coil of the step-up transformer is then applied across the gap of a spark plug. At operating speeds exceeding the overspeed threshold, a second trigger circuit renders the SCR conductive prior to substantial accumulation of charge across the storage capacitor. The second trigger circuit includes a zener diode or other voltage threshold element in circuit with a trigger coil operative to produce a speed dependent voltage signal. A high-pass filter, such as a passive RC filter, may be connected interposing the trigger coil and the zener diode to condition the waveform and inhibit accelerated trigger of the SCR at speeds below the overspeed threshold.

23 Claims, 4 Drawing Sheets

FIG. 4D

DISCHARGE IGNITION APPARATUS FOR INTERNAL COMBUSTION ENGINE HAVING BUILT-IN OVERSPEED DISABLE CAPABILITY

BACKGROUND OF THE INVENTION

The present invention generally relates to an improved ignition system for use in an internal combustion engine. More particularly, the invention relates to a discharge ignition apparatus that automatically interrupts spark ignition when engine speed has exceeded a predetermined value.

In the operation of various devices powered by a small gasoline engine, it is desirable to prevent a condition known as "overspeed." Overspeed typically occurs if the engine load is suddenly removed while the engine is operating at full throttle. For example, sudden breakage of the string of a string trimmer or the chain of a chain saw may cause engine RPM to increase rapidly. Such overspeed is undesirable for a number of reasons, including the possibility of damage to the engine.

Mechanical governors frequently utilized in the past to prevent an overspeed condition have often been found to be inherently unreliable. Thus, attempts have been made to incorporate speed control features into the engine's electronic ignition system. Examples of electronic ignitions including speed control features are shown in U.S. Pat. Nos. 5,245,965 to Andersson and 4,436,076 to Piteo. The present invention is directed to various novel ignition arrangements incorporating overspeed disable capability.

SUMMARY OF THE INVENTION

The present invention provides a discharge ignition apparatus for use with an internal combustion engine to produce an electrical spark at a spark ignition device. The apparatus comprises a magnet assembly, including a pair of pole faces, operatively revolved along a circular path, such as by the engine flywheel. A magnetically permeable core, having at least two leg portions each including a respective end face, is mounted adjacent to the circular path. Specifically, the leg portions are situated such that the pole faces of the magnet assembly pass proximate to the end faces during revolution of the magnet assembly. As a result, a magnetic flux is produced in the magnetically permeable core.

The discharge ignition apparatus further includes a discharge circuit having an energy storage element, such as a storage capacitor. A charge coil is further provided, having a voltage induced thereon by the magnetic flux to supply charging energy to the energy storage element during each revolution of the magnet assembly. A transformer, having a primary coil and a secondary coil, is also provided. The secondary coil is electrically connected during operation to the spark ignition device. An electronic switch is electrically connected in circuit with the energy storage element and the primary coil. A triggering signal applied to a triggering node of the electronic switch acts to render it conductive.

Triggering circuitry is also provided for generating the triggering signal and thereby activating the electronic switch. The triggering circuitry includes a first circuit portion operative to apply a first triggering signal to the triggering node after substantial accumulation of energy at the energy storage element. If a revolution speed of the magnet assembly is generally greater than a predetermined threshold, a second circuit portion is operative to apply a second triggering signal to the triggering node before substantial accumulation of energy at the energy storage element can occur.

In exemplary constructions, the second circuit portion may include a trigger coil connected in circuit with a voltage threshold element such that the second triggering signal will be produced when a speed dependent voltage across the voltage threshold element exceeds a predetermined threshold. The second circuit portion may further include a high-pass filter, such as a passive RC high-pass filter, connected in circuit between the trigger coil and the voltage threshold element. In addition, the charge coil and the trigger coil may each be situated about a first leg of the magnetically permeable core and the transformer may be situated about a second leg of the magnetically permeable core.

The invention further provides a discharge circuit for use in a discharge ignition system of the type operative to produce an electrical spark at a spark ignition device. The discharge circuit may include a storage capacitor, and a charge coil having a plurality of turns. A rectifier diode is preferably electrically connected between a second side of the charge coil and the storage capacitor. A first side of the charge coil may be electrically connected to relative ground.

The discharge circuit further includes a transformer having a primary coil and a secondary coil. Each of the primary coil and the secondary coil have a respective plurality of turns, defining a predetermined step-up ratio for the transformer. The secondary coil is electrically connected during operation to the spark ignition device to produce the electrical spark. Preferably, a first side of the primary coil is connected to relative ground. An electronic switch is further provided electrically connected in circuit with the storage capacitor and the primary coil. The electronic switch is rendered conductive by a triggering signal applied to a triggering node thereof.

The discharge circuit also includes a first trigger circuit electrically connected to a second side of the primary coil and the triggering node. The first trigger circuit is operative to apply a first triggering signal to the triggering node when a voltage of at least a first predetermined threshold appears at the primary coil. The first trigger circuit is thus similar to that shown in U.S. Pat. No. Re. 31,837, incorporated herein by reference.

A trigger coil having a plurality of turns is also provided, the trigger coil having a first side electrically connected to relative ground. A second trigger circuit is electrically connected between a second side of the trigger coil and the triggering node. The second trigger circuit applies a second triggering signal to the triggering node only if a voltage of at least a second predetermined threshold appears at the trigger coil. In this manner, the second trigger circuit can function to disable the discharge circuit prior to significant accumulation of charge at the storage capacitor.

In exemplary constructions, the second trigger circuit may include a zener diode having a predetermined breakdown voltage. The zener diode may be electrically connected in the second trigger circuit such that the second triggering signal will be applied to the triggering node if a voltage of at least the predetermined breakdown voltage appears thereacross. The second trigger circuit may further include a high-pass filter electrically connected in circuit between the second side of the trigger coil and the zener diode. The high-pass filter may comprise a filter capacitor having a first side electrically connected to the second side of the trigger coil and a second side connected to the zener diode. A resistive element may be electrically connected between a second side of the filter capacitor and relative ground. A blocking diode may also be provided, electrically connected between the zener diode and the triggering node.

The electronic switch may be a silicon controlled rectifier (SCR) electrically connected between the storage capacitor and relative ground. A ringback diode may also be provided, electrically connected between the storage capacitor and relative ground.

The present invention further provides a discharge ignition apparatus for use with an internal combustion engine to produce an electrical spark at a spark ignition device. The apparatus comprises a moveable magnet assembly including a pair of pole faces. A magnetically permeable core having at least two leg portions each including a respective end face is mounted such that the pole faces pass proximate to the end faces as the magnet assembly is operatively moved. As a result, a magnetic flux is produced in the magnetically permeable core.

The discharge ignition apparatus further includes a discharge circuit having an energy storage element. A charge coil is also provided having a charging voltage induced thereon by the magnetic flux to supply charging energy to the energy storage element. In addition, the discharge circuit includes a trigger coil having a trigger voltage induced thereon by the magnetic flux. The trigger coil is characterized by a trigger voltage having a high frequency component related to an operative speed of the magnet assembly. A transformer having a primary coil and a secondary coil is also provided. The secondary coil is electrically connected during operation to the spark ignition device.

An electronic switch, rendered conductive by a triggering signal applied to a triggering node thereof, is electrically connected between the energy storage element and relative ground. Circuit means are provided for discharging energy accumulated at the energy storage element through the primary coil if the operative speed of the moveable magnet assembly is generally below a predetermined threshold speed. In addition, the discharge circuit includes an overspeed disable circuit electrically connected between the trigger coil and the triggering node of the electronic switch. The overspeed disable circuit includes a high-pass filter to extract the high frequency component from the trigger voltage. A voltage threshold element is also provided to apply the triggering signal to the triggering node only if the operative speed of the moveable magnet generally exceeds the predetermined threshold speed.

In exemplary constructions, the overspeed disable circuit is configured having a RC network including a capacitative element and a resistive element electrically connected together between the trigger coil and relative ground to define a junction node therebetween. A zener diode having a characteristic breakdown voltage is electrically connected in circuit with the triggering node such that the triggering signal will be applied thereto when the high frequency component of the trigger voltage exceeds the breakdown voltage. A blocking diode may also be electrically connected between the zener diode and the triggering node to prevent loading through the primary trigger circuit. In addition, the electronic switch may be a silicon controlled rectifier (SCR) electrically connected between the energy storage element and relative ground.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only and is not intended as limiting the broader aspects of the present invention, which broader aspects are embodied in the exemplary constructions.

Figure 1:
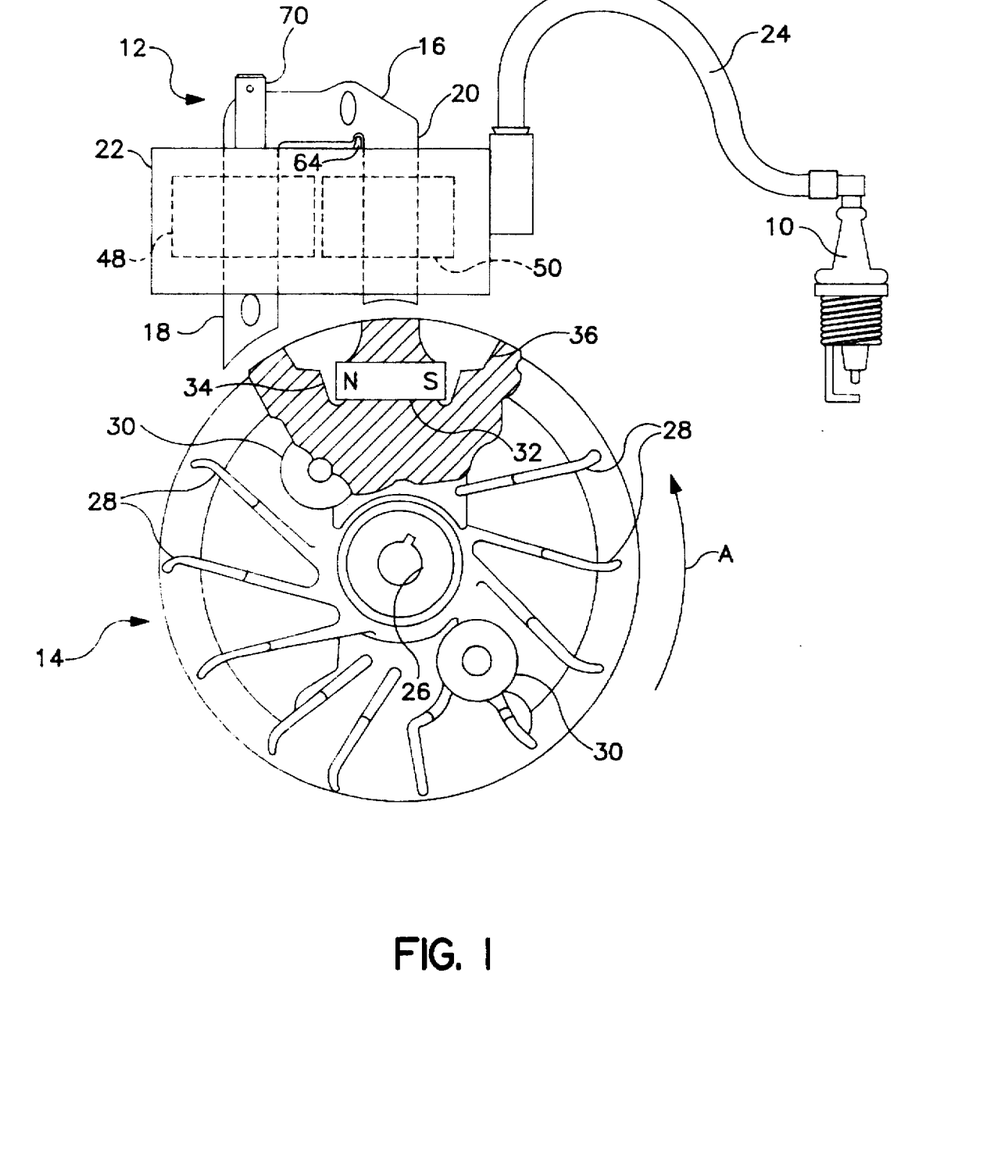
FIG. 1 is an elevational view of various components in a discharge ignition system such as may be constructed according to the present invention.

FIG. 1 illustrates a discharge ignition apparatus constructed in accordance with the present invention. The apparatus is configured to produce the requisite spark at spark plug 10 to ignite the air-fuel mixture within the piston cylinder of the engine. In addition to string trimmers and chain saws as discussed above, the apparatus may be used with various other devices powered by small gasoline engines, such as lawn mowers and the like.

Generally, the apparatus includes a stator unit 12 and a rotatable flywheel 14. Stator unit 12, which typically remains fixed with respect to the engine during use, includes a magnetically permeable core 16 having depending leg portions 18 and 20. A sealed housing 22 maintains the various coils and other components utilized to produce a spark at spark plug 10. Electrical connection with spark plug 10 is achieved by a typical interconnecting wire 24.

Flywheel 14 is mounted to an appropriate spindle of the engine by a central bore 26 defined therethrough. The spindle will be mechanically interconnected with the engine's drive shaft to produce a concomitant rotation of flywheel 14, such as in the direction indicated by arrow A. Bore 26 may define a slot as shown to mate with a complementary key mounted on the spindle. Often, flywheel 14 may further include vane members 28 to circulate cooling air around the engine. Flywheel 14 may also include integral bosses 30 for mounting starting pawls in a well-known manner.

A magnet assembly is mounted adjacent the periphery of flywheel 14 to revolve about a circular path in synchronism with operation of the engine. The magnet assembly includes a permanent magnet 32 having pole pieces 34 and 36 mounted at respective ends thereof. It will be appreciated that the circumferential faces of pole pieces 34 and 36 will pass proximate to the end faces of leg portions 18 and 20 as flywheel 14 is rotated. As a result, magnetic flux is produced within core 16, as desired.

The level of flux produced in core 16 will depend in part on the width of the air gap between the circumferential faces of pole pieces 34 and 36 and the end faces of leg portions 18 and 20. Thus, manufacturing parameters can affect the various voltage levels induced in the ignition apparatus.

Figure 2:
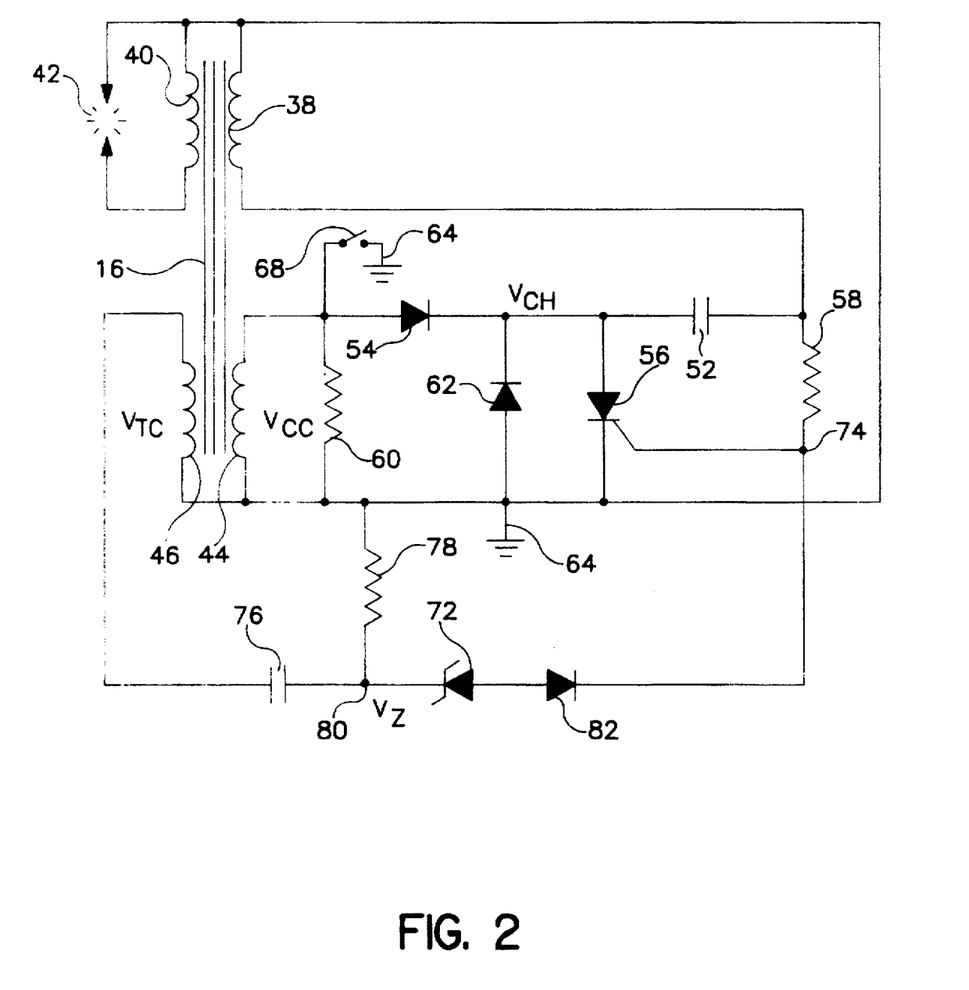
FIG. 2 is a schematic diagram illustrating an exemplary electronic ignition circuit constructed according to the present invention.

The various electronic components contained within sealed housing 22 of stator unit 12 may be most easily understood with reference to the schematic circuit diagram of FIG. 2. As can be seen, the circuit includes various coils wound about core 16. For example, the circuit includes a transformer including a primary coil 38 and a secondary coil 40 related by a predetermined step-up ratio. Secondary coil 40 is connected across the gap 42 of spark plug 10, as shown. The circuit further includes a charge coil 44 and a trigger coil 46.

In some exemplary embodiments, primary coil 38 and secondary coil 40 may be located adjacent to one another, but separated from charge coil 44 and trigger coil 46. Likewise, charge coil 44 and trigger coil 46 may be mounted adjacent to one another. As shown in FIG. 1, this may be accomplished by separate coil units 48 and 50 mounted on respective legs 18 and 20 of core 16.

Referring again to FIG. 2, it can be seen that charge coil 44 is electrically connected to a storage capacitor 52 through a rectifier diode 54. Capacitor 52 is, in turn, electrically connected in circuit with primary coil 38 through SCR 56. At speeds less than the undesirable overspeed condition, SCR 56 may be rendered conductive by a triggering pulse supplied to its gate through current limiting resistor 58. This triggering technique is similar to that described in U.S. Pat. No. Re. 31,837 to Burson, incorporated herein by reference.

A resistor 60 is provided to limit the induced voltage developed across charge coil 44 as capacitor 52 discharges through primary coil 38. Diode 62 functions as a ringback diode for reversal of the polarity of capacitor 52 during discharge. A floating ground, as indicated at 64, may be achieved by a tab, such as tab 66 of FIG. 1, which provides electrical communication with the engine block through core 16. A stop switch 68 may also be provided to disable operation of the ignition system.

The ignition circuit further includes circuitry functioning to prevent the occurrence of a spark at gap 42 if the engine speed exceeds a predetermined threshold. In the illustrated construction, this circuitry includes a voltage threshold element operatively associated with trigger coil 46. The voltage threshold element, here zener diode 72, operates to supply a triggering signal to the gate of SCR 56 when a voltage waveform having at least a high frequency component exceeding a predetermined value is induced on trigger coil 46. Specifically, the triggering signal for inhibiting spark is supplied to node 74 of the SCR gate. This triggering signal and the triggering signal supplied through resistor 58 function as logical "OR" input to node 74. Either of these signals will cause SCR 56 to be rendered conductive.

As will described more fully below, the actual voltage waveform produced at trigger coil 46 may often have a low frequency component that exceeds the breakdown voltage of zener diode 72 at speeds lower than the overspeed threshold at which spark is to be inhibited. Thus, the illustrated circuit further includes a suitable high-pass filter connected between trigger coil 46 and zener diode 72. In this case, the high-pass filter is a passive RC network including filter capacitor 76 and resistor 78. Zener diode 72 is connected at the junction node 80 between capacitor 76 and resistor 78, as shown. A diode 82 is provided in line between zener diode 72 and node 74 to prevent signal backfeed.

The operation of the circuit of FIG. 2 will now be described in relation to a series of voltage waveforms produced at various locations in the circuit. In particular, FIGS. 3A through 3D illustrate voltage waveforms produced in the circuit at a speed below the overspeed threshold. FIGS. 4A through 4D illustrate a series of voltage waveforms that may be produced when the speed exceeds the overspeed threshold. It will be appreciated that waveforms produced at the higher speed will be generally time compressed in relation to waveforms produced at the lower speed.

Figure 3A:
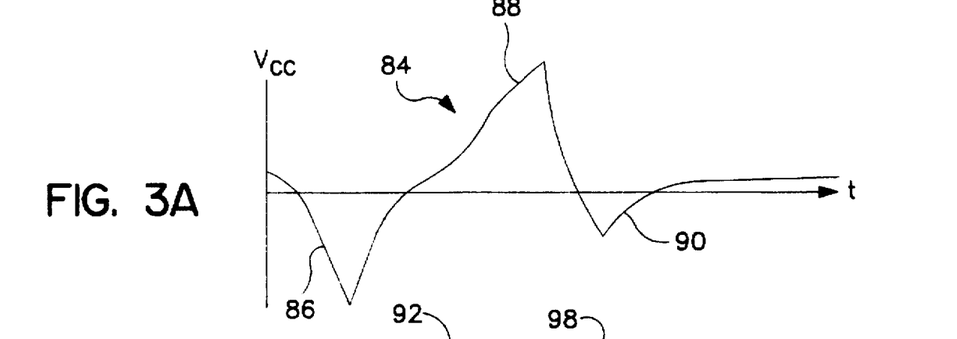
FIGS. 3A through 3D illustrate various voltage plots taken at respective locations in the circuit of FIG. 2 during operational speed.

FIG. 3A illustrates a waveform of the voltage $V_{cc}$ produced across charge coil 44 during one passage of the magnet assembly carried by flywheel 14. As can be seen, waveform 84 includes a first negative excursion 86 followed by a relatively large positive excursion 88. A smaller negative excursion 90 follows positive excursion 88. It will be appreciated that the polarity of waveform 84 is determined by the direction of flux within core 16 (and the direction in which the coil is wound).

Figure 3B:
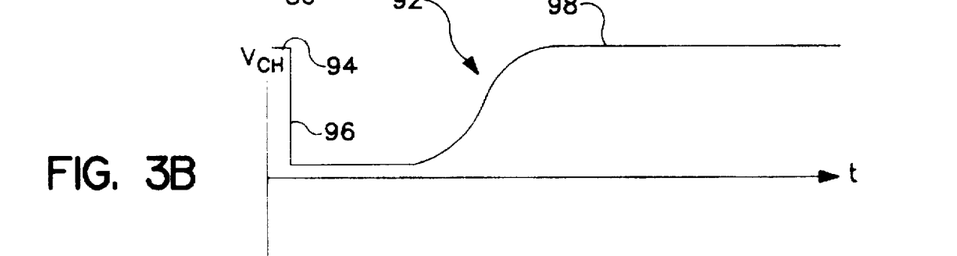

FIG. 3B illustrates a waveform of the voltage $V_{CH}$ such as may be produced across capacitor 52. As indicated at 94, capacitor 52 is fully charged at the beginning of this time sequence. Next, however, the voltage across primary coil 38 will raise to a level sufficient to supply a triggering signal to SCR 56. At this time, capacitor 52 will rapidly discharge, as indicated at 96, to produce a spark across gap 42. Capacitor 52 will then remain discharged until charged by the voltage excursion 88 of voltage $V_{cc}$, as indicated at 98. This sequence is then repeated for every revolution of the magnet assembly.

Because the engine is operating in this example at a speed below the overspeed threshold, it is desirable that the circuit not act to inhibit the spark produced across gap 42. In other words, the circuitry provided for overspeed disablement should not produce a disabling triggering signal at node 74. Toward this end, the voltage produced at node 80 should be less than the breakdown voltage of zener diode 72 plus the voltage necessary to forward bias diode 82 (which may be referred to generally as the breakdown voltage, $V_{BR}$).

Figure 3C:
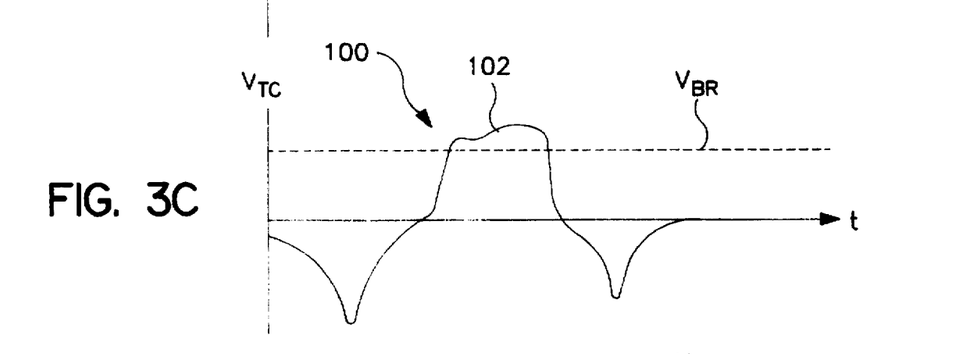

FIG. 3C shows a waveform 100 illustrating variations in the voltage $V_{TC}$ produced across trigger coil 46 during passage of the magnet assembly. As can be seen, waveform 100 includes a relatively flattened positive excursion 102 that exceeds $V_{BR}$. Thus, application of voltage $V_{TC}$ directly to zener diode 72 would undesirably produce a triggering signal at node 74.

Figure 3D:
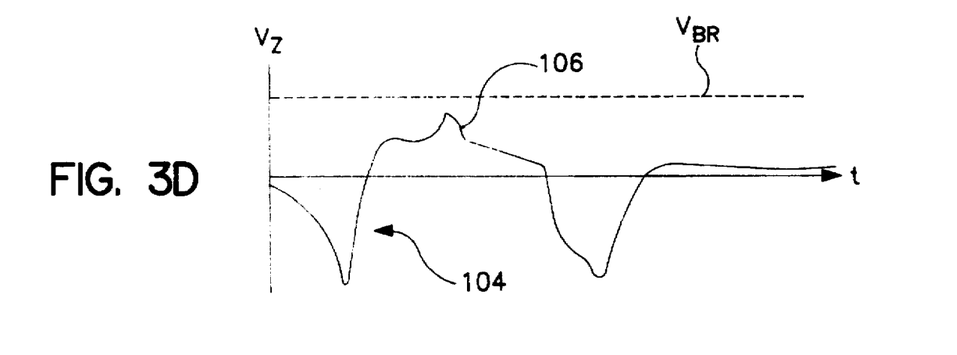

In accordance with the present invention, it has been found that positive excursion 102 can be described as a waveform having low frequency and high frequency components. The high frequency component will be related to the speed at which flywheel 14 rotates, whereas the low frequency components will be at least in part due to resonant frequencies inherent in the circuit, and other such factors. Thus, extraction of the high frequency component from waveform 100 produces a waveform that does not exceed the overspeed threshold until that speed is actually reached. This is illustrated in FIG. 3D which shows a waveform 104 of the voltage $V_z$ appearing at node 80. As shown, the positive excursion 106 remains well below voltage $V_{BR}$, as desired.

Figure 4A:
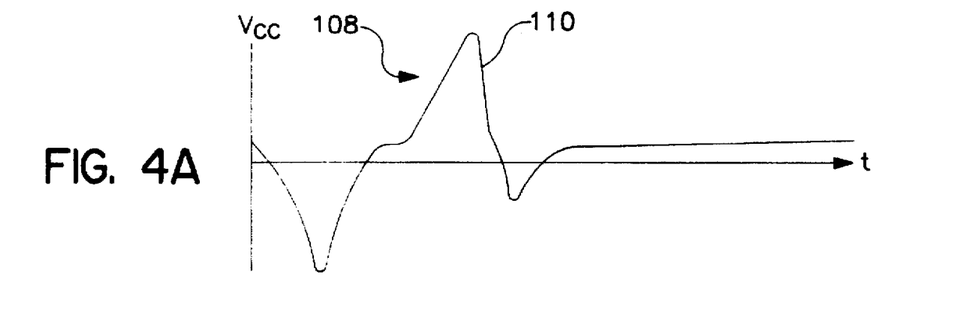
FIGS. 4A through 4D are voltage plots similar to respective of FIGS. 3A through 3D at a second operational speed above the overspeed threshold.

FIG. 4A illustrates a waveform 108 of the voltage $V_{cc}$ produced across charge coil 44 at a speed exceeding the overspeed threshold. As can be seen, waveform 108 is very similar to waveform 84, except being somewhat time compressed due to the faster operating speed. Thus, waveform 108 also has a relatively large positive excursion 110, as illustrated.

Figure 4B:
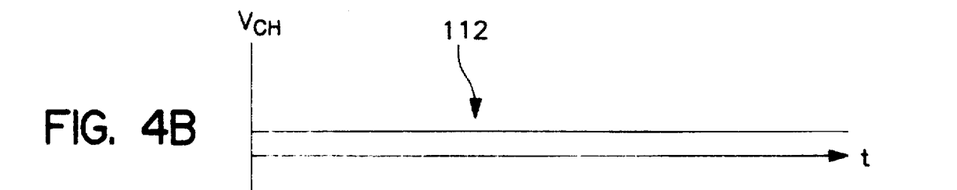

In order to prevent the production of a spark across gap 42, capacitor 52 is not allowed to receive a charge at this speed. Thus, as illustrated in FIG. 4B, the waveform 112 of voltage $V_{CH}$ will approximate a straight line. This is achieved by applying a triggering signal to node 74 at or before approximately the beginning of positive excursion 110. As a result, the voltage produced across charge coil 44 is applied to ground through SCR 56.

Figure 4C:
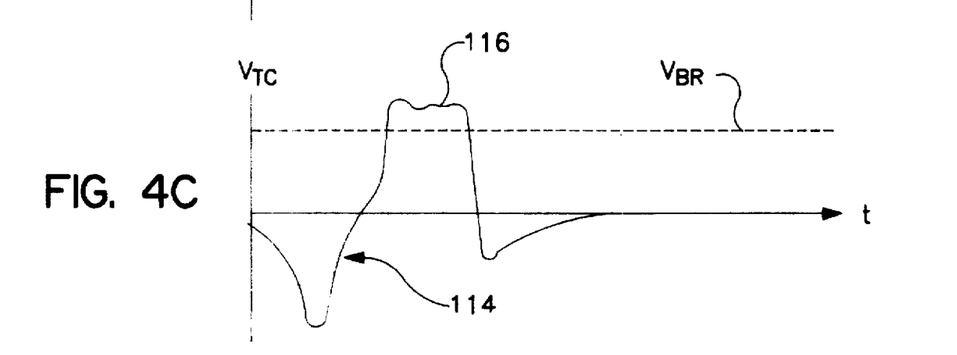
Figure 4D:
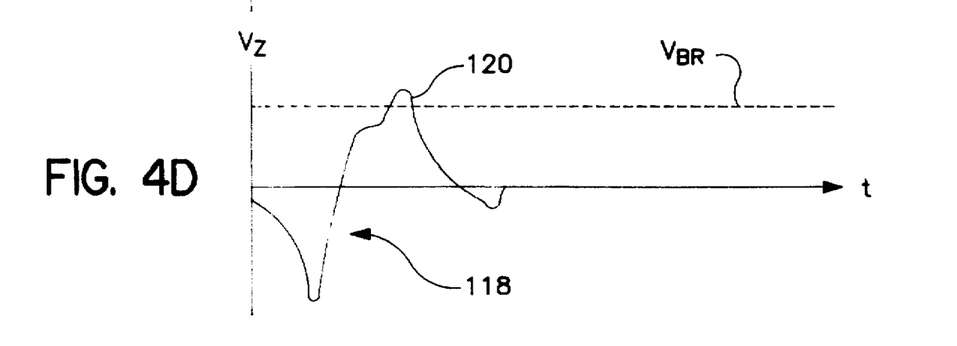

Referring now to FIGS. 4C and 4D, the accelerated triggering of SCR 56 is accomplished by ensuring that the voltage seen at node 80 exceeds voltage $V_{BR}$ before substantial accumulation of charge across capacitor 52. As shown, the waveform 114 of voltage $V_{TC}$ includes a positive excursion 116 exceeding voltage $V_{BR}$ by a significant margin. The high frequency component contained in waveform 114 is passed to node 80 to produce waveform 118 illustrated in FIG. 4D. As shown, positive excursion 120 of waveform 118 exceeds voltage $V_{BR}$ at the appropriate time. It will be appreciated that variations in the core-magnet air gap will cause the trigger voltage to vary and may thus affect the overspeed threshold if manufacturing tolerances are not adequately controlled.

Although not readily apparent from the drawing, the voltage across trigger coil 46 will generally have a phase that is slightly advanced with respect to voltages induced across charge coil 44. This phase difference, which is due at least in part to the relative loading of the two coils, is advantageous in that the excursion 120 of waveform 118 will tend to occur more in advance of excursion 110 of waveform 108 than would otherwise be the case. This tends to further inhibit the accumulation of charge across storage capacitor 52.

While preferred embodiments of the invention have been shown and described, modifications and variations be made thereto by those of ordinary skill in the art without departing from the spirit and scope of the present invention. For example, it may be desirable in some circuit arrangements to substitute an inductor or other circuit component as the energy storage element. In addition, it should be understood that aspects of various embodiments of the invention may be interchanged both in whole or in part. Furthermore, those of ordinary skill in the art will appreciate that the foregoing description is by way of example only, and is not intended to be limitative of the invention so further described in the appended claims.

What is claimed is:

1. A discharge ignition apparatus for use with an internal combustion engine to produce an electrical spark at a spark ignition device, said apparatus comprising:

a magnet assembly operatively revolved along a circular path, said magnet assembly including a pair of pole faces;

a magnetically permeable core mounted adjacent to said circular path and having at least two leg portions each including a respective end face, said leg portions being situated such that said pole faces pass proximate to said end faces during revolution of said magnet assembly and produce a magnetic flux in said magnetically permeable core;

a discharge circuit including:
(a) an energy storage element;
(b) a charge coil having a voltage induced thereon by said magnetic flux to supply charging energy to said energy storage element during each revolution of said magnet assembly;
(c) a transformer having a primary coil and a secondary coil, said secondary coil electrically connected during operation to the spark ignition device;
(d) an electronic switch electrically connected in circuit with said energy storage element and said primary coil, said electronic switch being rendered conductive by a triggering signal applied to a triggering node thereof;
(e) triggering circuitry including:
(1) a first circuit portion operative to apply a first triggering signal to said triggering node after substantial accumulation of energy at said energy storage element; and
(2) a second circuit portion operative to apply a second triggering signal to said triggering node before substantial accumulation of energy at said energy storage element can occur if a revolution speed of said magnet assembly is generally greater than a predetermined threshold, wherein said second circuit portion includes a trigger coil connected in circuit with a voltage threshold element such that said second triggering signal will be produced when a speed dependent voltage across said voltage threshold element exceeds a predetermined threshold and thereby renders said voltage threshold element conductive.

2. A discharge ignition apparatus for use with an internal combustion engine to produce an electrical spark at a spark ignition device, said apparatus comprising:

a magnet assembly operatively revolved along a circular path, said magnet assembly including a pair of pole faces;

a magnetically permeable core mounted adjacent to said circular path and having at least two leg portions each including a respective end face, said leg portions being situated such that said pole faces pass proximate to said end faces during revolution of said magnet assembly and produce a magnetic flux in said magnetically permeable core;

a discharge circuit including:
(a) an energy storage element;
(b) a charge coil having a voltage induced thereon by said magnetic flux to supply charging energy to said energy storage element during each revolution of said magnet assembly;
(c) a transformer having a primary coil and a secondary coil, said secondary coil electrically connected during operation to the spark ignition device;
(d) an electronic switch electrically connected in circuit with said energy storage element and said primary coil, said electronic switch being rendered conductive by a triggering signal applied to a triggering node thereof;
(e) triggering circuitry including:
(1) a first circuit portion operative to apply a first triggering signal to said triggering node after substantial accumulation of energy at said energy storage element; and
(2) a second circuit portion operative to apply a second triggering signal to said triggering node before substantial accumulation of energy at said energy storage element can occur if a revolution speed of said magnet assembly is generally greater than a predetermined threshold, said second circuit portion including a trigger coil connected in circuit with a voltage threshold element such that said second triggering signal will be produced when a speed dependent voltage across said voltage threshold element exceeds a predetermined threshold, and further wherein said second circuit portion includes a high-pass filter connected in circuit between said trigger coil and said voltage threshold element.

3. An apparatus as set forth in claim 2, wherein said high-pass filter is a passive RC high-pass filter.

4. A discharge ignition apparatus for use with an internal combustion engine to produce an electrical spark at a spark ignition device, said apparatus comprising:

a magnet assembly operatively revolved along a circular path, said magnet assembly including a pair of pole faces;

a magnetically permeable core mounted adjacent to said circular path and having at least two leg portions each including a respective end face, said leg portions being situated such that said pole faces pass proximate to said end faces during revolution of said magnet assembly and produce a magnetic flux in said magnetically permeable core;

a discharge circuit including:
(a) an energy storage element;
(b) a charge coil having a voltage induced thereon by said magnetic flux to supply charging energy to said energy storage element during each revolution of said magnet assembly;
(c) a transformer having a primary coil and a secondary coil, said secondary coil electrically connected during operation to the spark ignition device;
(d) an electronic switch electrically connected in circuit with said energy storage element and said primary coil, said electronic switch being rendered conductive by a triggering signal applied to a triggering node thereof;
(e) triggering circuitry including:
  (1) a first circuit portion operative to apply a first triggering signal to said triggering node after substantial accumulation of energy at said energy storage element; and
  (2) a second circuit portion operative to apply a second triggering signal to said triggering node before substantial accumulation of energy at said energy storage element can occur if a revolution speed of said magnet assembly is generally greater than a predetermined threshold, said second circuit portion including a trigger coil connected in circuit with a voltage threshold element such that said second triggering signal will be produced when a speed dependent voltage across said voltage threshold element exceeds a predetermined threshold, and further wherein said charge coil and said trigger coil are each situated about a first leg of said magnetically permeable core and said transformer is situated about a second leg of said magnetically permeable core.

5. An apparatus as set forth in claim 1, wherein said energy storage element is a capacitative storage element.

6. An apparatus as set forth in claim 5, wherein said first circuit portion includes a resistive element electrically connected between said primary coil and said triggering node.

7. An apparatus as set forth in claim 5, wherein said magnet assembly is carried by a rotatable engine flywheel.

8. A discharge circuit for use in a discharge ignition system of the type operative to produce an electrical spark at a spark ignition device, said circuit comprising:

(a) a storage capacitor;
(b) a charge coil having a plurality of turns, said charge coil having a first side electrically connected to relative ground;
(c) a trigger coil having a plurality of turns, said trigger coil having a first side electrically connected to relative ground;
(d) a rectifier diode electrically connected between a second side of said charge coil and said storage capacitor;
(e) a transformer including a primary coil and a secondary coil having a respective plurality of turns defined by a predetermined step-up ratio, said secondary coil electrically connected during operation to the spark ignition device to produce the electrical spark, a first side of the primary coil electrically connected to said relative ground;
(f) an electronic switch electrically connected in circuit with said storage capacitor and said primary coil, said electronic switch being rendered conductive by a triggering signal applied to a triggering node thereof;
(g) a first trigger circuit electrically connected between a second side of said primary coil and said triggering node, said first trigger circuit operative to apply a first triggering signal to said triggering node when a voltage of at least a first predetermined threshold appears at said primary coil; and
(h) a second trigger circuit electrically connected between a second side of said trigger coil and said triggering node, said second trigger circuit operative to apply a second triggering signal to said triggering node only if a voltage of at least a second predetermined threshold appears at said trigger coil.

9. A circuit as set forth in claim 8, wherein said second trigger circuit includes a zener diode having a predetermined breakdown voltage, said zener diode being electrically connected in said second trigger circuit such that said second triggering signal will be applied to said triggering node if a voltage of at least said predetermined breakdown voltage appears at said zener diode.

10. A circuit as set forth in claim 9, wherein said second trigger circuit further includes a high-pass filter electrically connected in circuit between said second side of said trigger coil and said zener diode.

11. A circuit as set forth in claim 10, wherein said high-pass filter comprises:

a filter capacitor having first side electrically connected to said second side of said trigger coil and a second side connected to said zener diode; and a resistive element electrically connected between a second side of said filter capacitor and relative ground.

12. A circuit as set forth in claim 10, further comprising a blocking diode electrically connected between said zener diode and said triggering node.

13. A circuit as set forth in claim 8, wherein said first trigger circuit includes a current limiting resistor electrically connected between said second side of said primary coil and said triggering node.

14. A circuit as set forth in claim 8, wherein said electronic switch is a silicon-controlled rectifier (SCR) electrically connected between said storage capacitor and said relative ground.

15. A circuit as set forth in claim 14, further comprising a ringback diode electrically connected between said storage capacitor and said relative ground.

16. A discharge ignition apparatus for use with an internal combustion engine to produce an electrical spark at a spark ignition device, said apparatus comprising:

a movable magnet assembly, said magnet assembly including a pair of pole faces;

a magnetically permeable core having at least two leg portions each including a respective end face, said magnetically permeable core being mounted such that said pole faces pass proximate to said end faces as said magnet assembly is operatively moved to produce a magnetic flux in said magnetically permeable core;

a discharge circuit including:
(a) an energy storage element;
(b) a charge coil having a charging voltage induced thereon by said magnetic flux to supply charging energy to said energy storage element;
(c) a trigger coil having a trigger voltage induced thereon by said magnetic flux, said trigger voltage exhibiting a high frequency component related to an operative speed of said magnet assembly;
(d) a transformer having a primary coil and a secondary coil, said secondary coil electrically connected during operation to the spark ignition device;
(e) an electronic switch electrically connected between said energy storage element and relative ground, said electronic switch being rendered conductive by application of a triggering signal to a triggering node thereof;
(f) circuit means for discharging energy accumulated at said energy storage element through said primary coil if said operative speed of said movable magnet assembly is generally below a predetermined threshold speed; and
(g) an overspeed disable circuit electrically connected between said trigger coil and said triggering node of said electronic switch, said overspeed disable circuit including a high-pass filter to extract said high-frequency component from said trigger voltage and a voltage threshold element to apply said triggering signal to said triggering node only if said operative speed of said movable magnet assembly generally exceeds said predetermined threshold speed.

17. A discharge ignition apparatus as set forth in claim 16, wherein said overspeed disable circuit is configured having the following circuit arrangement:

a RC network having a capacitative element and a resistive element electrically connected together between said trigger coil and relative ground to define a junction node therebetween; and a zener diode having a characteristic breakdown voltage, said zener diode being further electrically connected in circuit with said triggering node such that said triggering signal will be applied thereto when said high-frequency component of said trigger voltage exceeds said breakdown voltage.

18. An apparatus as set forth in claim 17, further comprising a blocking diode electrically connected between said zener diode and said triggering node.

19. An apparatus as set forth in claim 18, wherein said electronic switch is a silicon-controlled rectifier (SCR) electrically connected between said energy storage element and said relative ground.

20. An apparatus as set forth in claim 16, wherein said high-pass filter is a passive RC high-pass filter.

21. An apparatus as set forth in claim 16, wherein said charge coil and said trigger coil are each situated about a first leg of said magnetically permeable core and said transformer is situated about a second leg of said magnetically permeable core.

22. An apparatus as set forth in claim 16, wherein said energy storage element is a capacitative storage element.

23. An apparatus as set forth in claim 16, wherein said magnet assembly is carried by a rotatable engine flywheel.

* * * * *

UNITED STATES PATENT AND TRADEMARK OFFICE
CERTIFICATE OF CORRECTION

PATENT NO. : 5,755,199
DATED : May 26, 1998
INVENTOR(S) : Costello et al.

It is certified that error appears in the above-indentified patent and that said Letters Patent is hereby corrected as shown below:

On the title page:
  Under "References Cited," please list the following:

U.S. PATENT DOCUMENTS

| | | |
|---|---|---|
| RE 31837 | 02/1985 | Burson |
| 4,324,215 | 04/1982 | Sieja |
| 4,436,076 | 03/1984 | Piteo |
| 4,491,105 | 01/1985 | Johansson |
| 5,014,665 | 05/1991 | Faijersson |
| 5,052,359 | 10/1991 | Hardwick, et al. |
| 5,226,920 | 07/1993 | Andreasson |
| 5,245,965 | 09/1993 | Andersson |
| 5,513,619 | 05/1996 | Chen, et al. |

Signed and Sealed this

First Day of December, 1998

*Attest:*

BRUCE LEHMAN

*Attesting Officer*   *Commissioner of Patents and Trademarks*